March 24, 1936.    R. S. LANGDON    2,035,134
ADJUSTABLE BOOM YARDER
Filed May 14, 1935    3 Sheets-Sheet 3
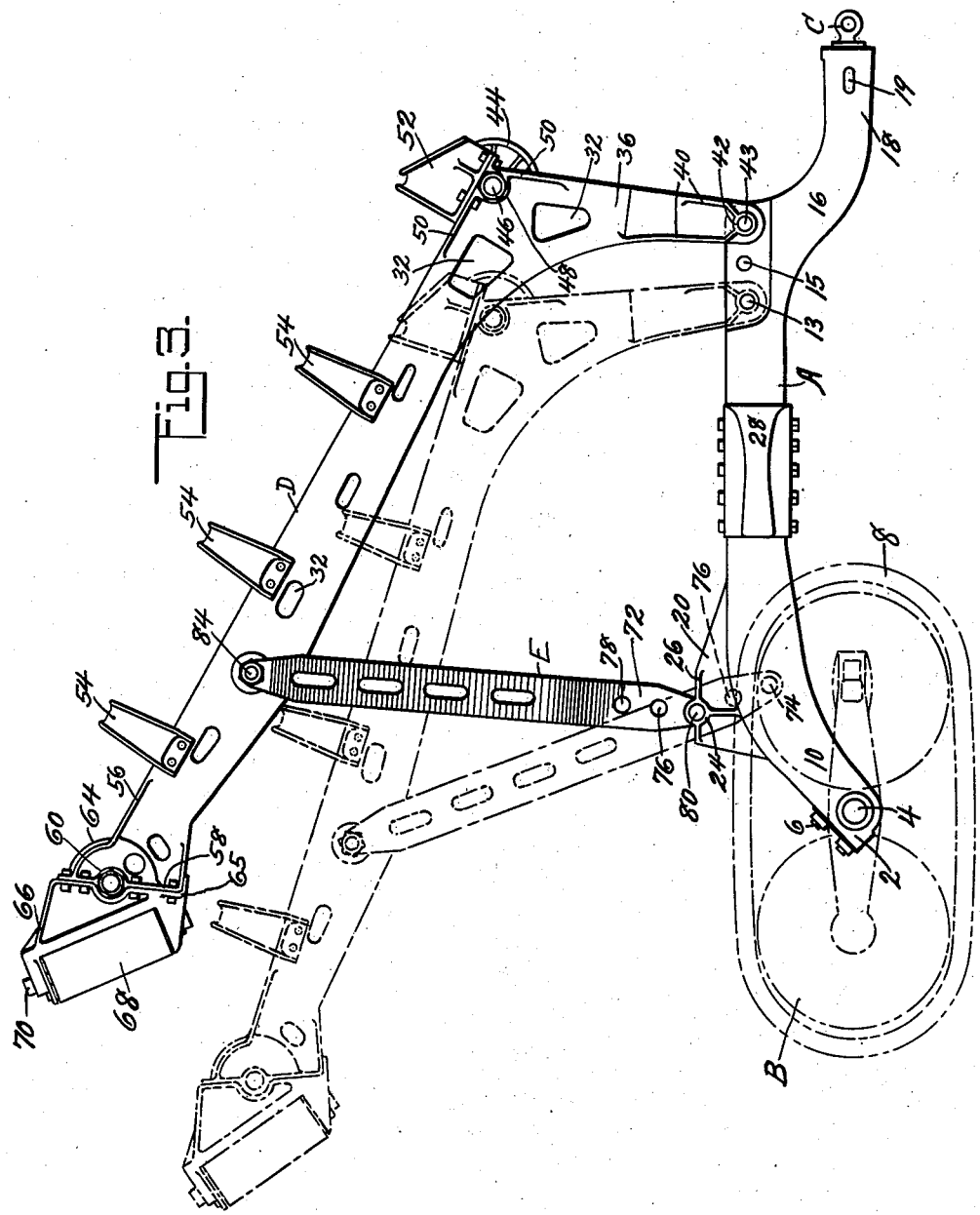
INVENTOR
Robert S. Langdon
BY
ATTORNEY Patented Mar. 24, 1936

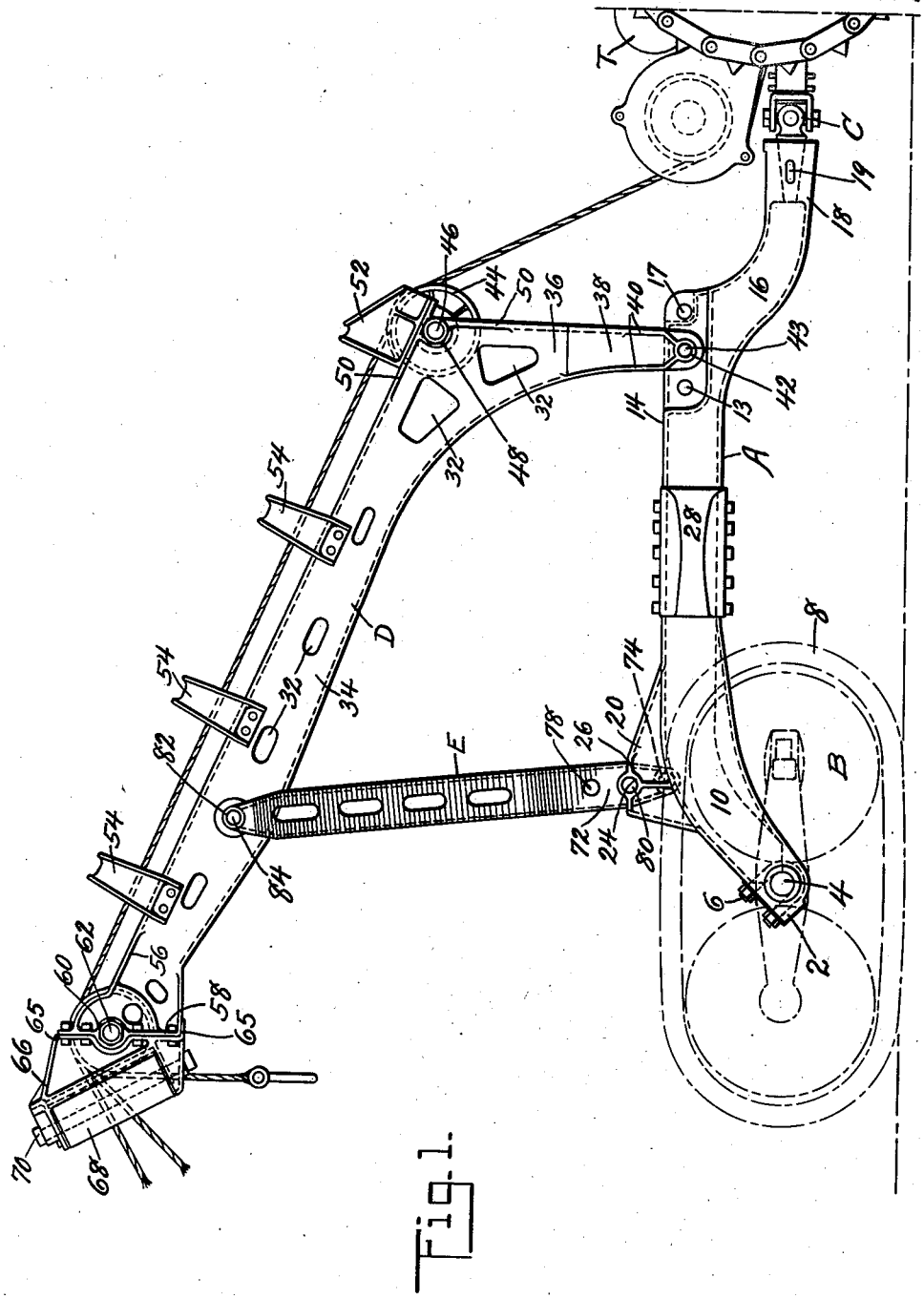

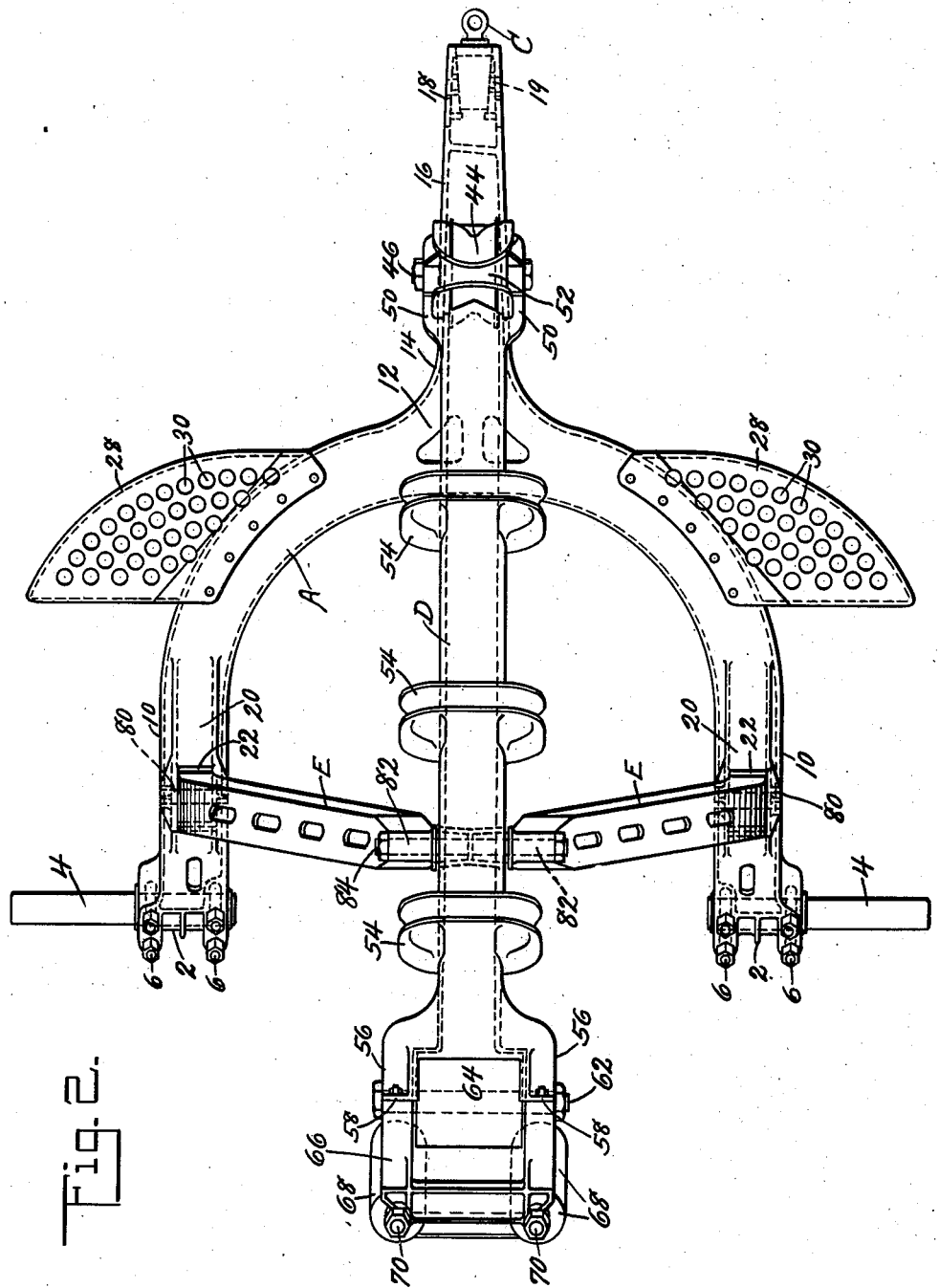

2,035,134

UNITED STATES PATENT OFFICE 2,035,134

ADJUSTABLE BOOM YARDER

Robert S. Langdon, Sumner, Wash., assignor to Pacific Car and Foundry Company, Seattle, Wash., a corporation of Washington Application May 14, 1935, Serial No. 21,315

4 Claims. (Cl. 254—139.1)

This invention relates to material handling apparatus in general and to apparatus designed for use in the bunching and moving of logs in particular.

Apparatus which is intended for use in logging or similar operations must be strong, well balanced and flexible enough to permit of easy manipulation in cramped quarters. An apparatus of this nature is fully described and claimed in my Patent 1,918,409, of which the present invention is an improvement, and further description is unnecessary since this apparatus is now well known to those interested in logging operations.

In equipment which is primarily intended for use as an accessory to a winch equipped tractor or other mobile power unit it is necessary that the equipment be so constructed as to be readily attachable to and give complete satisfaction with tractors of various sizes and weights. It is therefore an object of this invention to provide an accessory or trailer which may be readily altered to give maximum satisfaction with several sizes and weights of tractors.

It is another object of this invention to provide a trailer equipped with a boom the height and angular position of which may be readily altered.

It is a still further object of this invention to provide a trailer equipped with a boom which may be adjusted vertically as well as horizontally.

These and other objects will be apparent to one skilled in the art after a study of the accompanying description taken in conjunction with the attached drawings in which:

Figure 1 is an elevation of the device in an intermediate position of adjustment and shown as coupled to a tractor;

Fig. 2 is a plan view of the device;

Fig. 3 is an elevation showing the device in two extreme positions of adjustment.

Referring now to the drawings in which like characters refer to like parts throughout the various views it is seen that the trailer consists of base frame A carried by supporting means B and jointed coupling C connecting the tractor T and trailer. The base frame A supports the boom D and struts E all as clearly shown in Fig. 1.

The base frame A, preferably cast in one piece, is Y-shaped in plan with all parts of box cross section wherever possible. The rear portions 2 or tips of the Y are provided with trunnions 4 fastened in place by U bolts or other means 6. On each of the trunnions is pivotally mounted a truck unit 8 preferably of the endless tread type although this is purely representative since a wheel, skid or other means peculiarly adapted for the service necessary could be used. From the tips 2 the arms are inclined upwardly and forwardly at 10, then they converge in a horizontal plane to their junction at 12 from which point the stem 14 of the Y extends forwardly in a horizontal plane then forwardly and downwardly at 16 to terminate in a horizontal forwardly facing portion 18 of box section adapted to receive the coupling C secured in place by key 19. The arms are provided on their upper surface and adjacent the rear portion with narrow box-shaped upstanding members 20, having an elongated opening 22 on the sides of which are bearings 24 properly strengthened and braced by gussets 26. These upstanding members 20 not only provide bearings 24, the purpose of which will be later described, but due to their position and elongated connection to the arms strengthen the arms over a considerable area especially at the bend. The upper forward part of the horizontal portion 14 of the Y stem has the sides inset a small amount and pierced by three holes 13, 15 and 17, the purpose of which will be more fully described later.

Heavy cast fenders 28 are connected to the arms by suitable means so as to brace the arms of the Y and curve outwardly and rearwardly to protect the supporting means B and are provided with lightening openings 30 which may be used to attach anchoring or accessory devices if needed.

The boom D is likewise preferably cast in one piece of box cross-section lightened as much as possible by core openings 32 and is provided with a substantially straight portion 34 and an angularly disposed portion 36 terminating in spaced arms 38 on the ends of which are gussets 40 bracing bearings 42 adapted to cooperate with one of the openings 13, 15 or 17 and to be held by bolt 43.

The pulley wheel 44 mounted on bolt 46 is carried in bearings 48 suitably braced by gussets 50. In order to accommodate this pulley it is necessary to cut away the web of both the straight and angular portions, therefore a heavy cable guard 52 is provided covering the pulley and compensating in part for the metal removed. Additional cable guards 54 are also provided.

The outer or rear end of the boom is provided with spaced portions 56 braced by flanges 58 which are thickened at 60 to provide a support for bolt 62 on which is suitably mounted roller 64. The guide roller head 66 is provided with a pair of guide rollers 68 journaled on bolts 70 and angularly disposed with respect to the roller 64.

The guide head is provided with suitable bolting flanges 65 by means of which it is removably fastened to the flanges 58 of the boom.

Struts E, also preferably cast in one piece and of box cross-section, are provided with a lower vertical portion 72 provided with three holes 74, 76 and 78 each adapted as selected to register with bearings 24 to receive a supporting pin 80. The vertical portion of the strut is of such a width as to be readily slidable within the opening 22. The struts incline upwardly and inwardly from the vertical portion until they meet the sides of the boom at which point they are provided with an opening 82 adapted to receive a bolt 84 pivotally supporting the boom.

It is thus seen that a trailer device is provided which is very similar to that disclosed in my prior patent with the exception that the struts E and boom D are adjustably connected to the base frame A and are of improved form.

The base frame A, boom D and struts E form a triangle, the apices of which are formed by the pins or bolts 43, 80 and 84, the position of at least two of which may be changed relative to the sides. Changing the apices means of course that the length of side is changed, thus the angles and length of side of the triangle may be readily adjusted.

The provision of three holes in the struts and three in the base frame permits nine possible adjustments of the boom angle and overhang which will permit its satisfactory use with several different weights of tractors by simple pin adjustments. The three holes in the base frame A permit of horizontal adjustment of the boom with but slight change in its angular position while the three holes in the struts E permit of vertical adjustment of the boom with but slight change in the horizontal position or overhang. Three of the possible nine positions are shown in Figs. 1 and 3.

The base frame and struts have been shown and described as provided with only three holes each for adjustment, but this is purely representative, as more or less holes may be readily provided; and if a still greater degree of flexibility is desired adjustment between the boom and strut may be provided thus giving several positions for bolt 84. In this way instead of being able to vary the length of but two sides of the triangle it would be possible to vary three thus giving the maximum degree of adjustability.

Various modifications and improvements other than those mentioned will be apparent to one skilled in the art and may be made without departing from the scope of the invention as defined by the following claims.

What is claimed is:

1. A material moving trailer comprising in combination, transversely spaced supporting means, a frame carried therebetween and adapted for attachment to a tractor, a rearwardly directed load lifting boom adjustably connected at its forward portion to said frame, and struts adjustably connected to the frame intermediate the ends thereof and supporting the rear portion of the boom, said adjustable connections permitting both vertical and horizontal adjustment of the boom whereby for a given load supported by the boom various loadings may be transmitted to the tractor.

2. A material moving trailer comprising in combination, transversely spaced supporting means, a frame carried therebetween and adapted for attachment to a tractor, a rearwardly directed load lifting boom adjustably connected at its forward portion to said frame, and boom supporting struts connected to the frame and boom intermediate the ends thereof, said connections permitting horizontal adjustment of the boom with but slight change in the vertical position thereof whereby for a given load supported by the boom various loadings may be transmitted to the tractor while maintaining maximum lift of the load.

3. A material moving trailer comprising in combination, transversely spaced supporting means, a frame carried therebetween and adapted for attachment to a tractor, a rearwardly directed load lifting boom connected at its forward portion to said frame and overhanging the rear portion thereof, struts adjustably connected to the frame and connected to the boom to support the rear portion of the latter, said connections permitting vertical adjustment of the boom with but a slight change in the amount of overhang whereby for a given load supported by the boom slight changes in loadings may be transmitted to the tractor while varying materially the lift of the load.

4. A material moving trailer comprising in combination, transversely spaced supporting means, a frame carried therebetween and adapted for attachment to a tractor, a rearwardly directed load lifting boom coupled to said frame, struts connected to said frame and to said boom to support the latter, said frame, struts and boom being so coupled as to form a triangle, the length of at least two sides of which may be varied.

ROBERT S. LANGDON.